(12) United States Patent
Tanaka et al.

(10) Patent No.: US 8,555,740 B2
(45) Date of Patent: Oct. 15, 2013

(54) TRANSMISSION FOR INTERNAL COMBUSTION ENGINE

(75) Inventors: Masataka Tanaka, Wako (JP); Masahiko Tsuchiya, Wako (JP); Yasuhiro Higashi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 236 days.

(21) Appl. No.: 13/051,702

(22) Filed: Mar. 18, 2011

(65) Prior Publication Data

US 2011/0232400 A1 Sep. 29, 2011

(30) Foreign Application Priority Data

Mar. 23, 2010 (JP) ................................. 2010-066375

(51) Int. Cl.
*F16H 3/08* (2006.01)

(52) U.S. Cl.
USPC .............................................. 74/342; 74/359

(58) Field of Classification Search
USPC .................... 74/340, 342, 343, 352, 359, 375
See application file for complete search history.

(56) References Cited

U.S. PATENT DOCUMENTS

| 2008/0099305 A1* | 5/2008 | Ogasawara ................. 192/82 R |
| 2008/0099306 A1* | 5/2008 | Tsukada et al. ............ 192/82 R |
| 2009/0084651 A1 | 4/2009 | Fujimoto et al. |

FOREIGN PATENT DOCUMENTS

| EP | 1 770 315 A1 | 4/2007 |
| EP | 2042783 A1 | 4/2009 |
| GB | 180925 A | 6/1922 |
| GB | 1344115 A | 1/1974 |
| GB | 2081822 A | 2/1982 |
| JP | 2009-83684 A | 4/2009 |

* cited by examiner

*Primary Examiner* — Ha D Ho
(74) *Attorney, Agent, or Firm* — Birch, Stewart, Kolasch & Birch, LLP (57) ABSTRACT

A transmission for an internal combustion engine that allows a fit length between a dog and a dog hole to be made longer and gear splines to be made longer, without having to increase an axial length of the transmission. A transmission selectively performs gearshifting by using a shift fork to slidingly move a shift gear of the transmission axially and by using a dog clutch to engage the shift gear with, or disengage the shift gear from, an adjacent gear. When the shift gear slidingly moves, a gear-side spline portion of the shift gear slidingly moves over a shaft-side spline portion.

18 Claims, 7 Drawing Sheets

TRANSMISSION FOR INTERNAL COMBUSTION ENGINE

CROSS-REFERENCE TO RELATED APPLICATIONS

The present application claims priority under 35 USC 119 to Japanese Patent Application No. 2010-066375 filed on Mar. 23, 2010 the entire contents of which are hereby incorporated by reference.

BACKGROUND OF THE INVENTION

1. Field of the Invention

The present invention relates to a transmission for an internal combustion engine.

2. Description of Background Art

A known transmission for an internal combustion engine performs gearshifting by using a gear that fits over splines on a shaft and is thereby axially moved to be engaged with, or disengaged from, an adjacent gear by a dog disposed on one side and a dog hole disposed on the other side. See, for example, Japanese Patent Laid-open No. 2009-83684.

Because of play between the gear and the splines in the transmission for an internal combustion engine disclosed in Japanese Patent Laid-open No. 2009-83684, a contact surface of the dog tilts when the dog fits into (is connected with) the dog hole, so that a thrust force is produced in a direction of disengaging a dog clutch. As a result, a friction force produced in a contact surface between a shift fork that axially moves the gear and the gear becomes large, so that the shift fork wears a large amount. To prevent this from occurring, it becomes necessary either to make a fit length longer between the dog and the dog hole or to extend the splines of the gear. This, however, result in the transmission having a longer axial length.

SUMMARY AND OBJECTS OF THE INVENTION

The present invention has been made in view of the foregoing and it is an object of an embodiment of the present invention to provide a transmission for an internal combustion engine that allows a fit length between a dog and a dog hole to be made longer and gear splines to be made longer, without having to make an axial length of the transmission longer.

To achieve the foregoing object, according to an embodiment of present invention a transmission for an internal combustion engine is provided that includes a main shaft; a countershaft disposed in parallel with the main shaft; and a shifting gear group disposed between the main shaft and the countershaft. The shifting gear group includes shift gears fitted axially slidably into shaft-side spline portions formed in at least either the main shaft or the countershaft. The transmission selectively performs gearshifting by using shift forks to slidingly move the shift gears axially and by using dog clutches to engage the shift gears with, or disengage the shift gears from, adjacent gears. In the transmission, when the shift gear slidingly moves, a gear-side spline portion of the shift gear slidingly moves over the shaft-side spline portion.

According to an embodiment of present invention, on at least either the main shaft or the countershaft, a splined portion of the shift gear, in which the gear-side spline portion is formed, has an axially protruding protrusion formed on an end portion of the splined portion on a side spaced apart from the sixth dog clutch; and the protrusion protrudes from a shaft end portion in which the shaft-side spline portion is disposed.

According to an embodiment of present invention, the shift gear disposed on the side spaced apart from the dog clutch has a recess, in which the protrusion is accommodated.

According to an embodiment of present invention, a dog or a dog hole of the dog clutches has an abutment surface that is formed into an inverted taper.

According to an embodiment of present invention, the main shaft includes a first input shaft and a second input shaft disposed mutually concentrically and rotatable about an identical axis; and the transmission is used for a twin-clutch gearbox that includes a first clutch disposed between the first input shaft and a driving power source and a second clutch disposed between the second input shaft and a driving power source and that performs gearshifting by alternately selecting between the first clutch and the second clutch.

According to an embodiment of present invention, odd-numbered speed gears of the shifting gear group for a first speed, a fifth speed, and a third speed are disposed in sequence on the first input shaft disposed on an inside of the second input shaft; even-numbered speed gears of the shifting gear group for a fourth speed, a sixth speed, and a second speed are disposed in sequence on the second input shaft; the third-speed drive gear and the fourth-speed drive gear are disposed adjacent to each other; and the gear-side spline portion of the fourth-speed drive gear is extended.

According to an embodiment of present invention, when the shift gear slidingly moves, the gear-side spline portion of the shift gear slidingly moves over the shaft-side spline portion. A fit length between the dog and the dog hole, and a length of the gear-side spline portion, can therefore be made longer without having to make the transmission have a long axial length. The shaft-side spline portion can also be made shorter in length.

According to an embodiment of present invention, the protrusion that axially protrudes is formed on the end portion of the splined portion of the shift gear on the side spaced apart from the dog clutch. The protrusion protrudes from the shaft end portion in which the shaft-side spline portion is disposed. These allow the fit length between the dog and the dog hole and the length of the gear-side spline portion to be made longer.

According to an embodiment of present invention, the shift gear disposed on the side spaced apart from the dog clutch has the recess, in which the protrusion is accommodated. This allows the fit length between the dog and the dog hole and the length of the gear-side spline portion to be made longer.

According to an embodiment of present invention, the abutment surface of the dog or the dog hole of the dog clutch is formed into an inverted taper. This reduces a thrust force that is produced when the dog and the dog hole are fitted with each other.

According to an embodiment of present invention, the transmission is used for the twin-clutch gearbox that includes the first clutch disposed between the first input shaft and the driving power source and the second clutch disposed between the second input shaft and the driving power source and that performs gearshifting by alternately selecting between the first clutch and the second clutch. This allows the twin-clutch gearbox to have a short axial length.

According to an embodiment of present invention, the odd-numbered speed gears for the first, fifth, and third speeds are disposed in sequence on the first input shaft disposed on the inside of the second input shaft, the even-numbered speed gears for the fourth, sixth, and second speeds are disposed in sequence on the second input shaft, the third-speed drive gear and the fourth-speed drive gear are disposed adjacent to each other, and the gear-side spline portion of the fourth-speed drive gear is extended. The thrust force of the sixth-speed drive gear, in which the greatest thrust force is produced, can therefore be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One preferred embodiment of a transmission for an internal combustion engine to which the present invention is applied will be described below with reference to the accompanying drawings. The drawings should be viewed in the direction of reference symbols. Throughout the descriptions given hereunder, expressions indicating directions including front and rear, right and left, and upper and lower mean the same directions as those as viewed from a rider. In the drawings, an arrow Fr indicates forward of the vehicle, an arrow Rr indicates rearward of the vehicle, an arrow L indicates leftward of the vehicle, an arrow R indicates rightward of the vehicle, an arrow U indicates upward of the vehicle, and an arrow D indicates downward of the vehicle.

Figure 1:
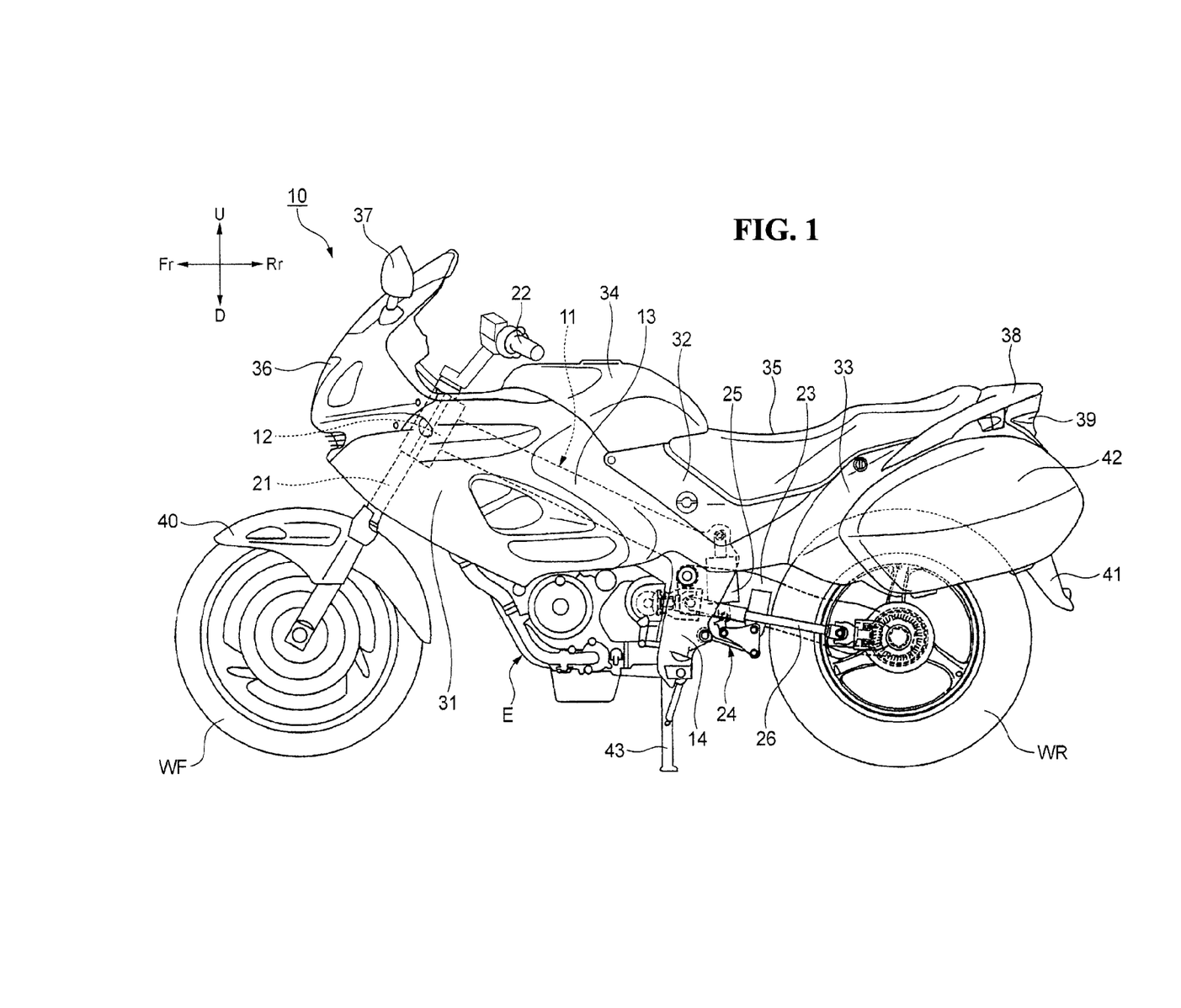
FIG. 1 is a left side elevational view for illustrating a motorcycle in which one preferred embodiment of a transmission for an internal combustion engine according to the present invention is mounted.

Referring first to FIG. 1, a motorcycle 10 includes a vehicle body frame 11 that includes a head pipe 12, a pair of left and right main frames 13, and a pair of left and right pivot plates 14. The main frames 13 extend rearwardly from the head pipe 12. The pivot plates 14 are connected to the main frames 13 and extend downwardly therefrom.

The motorcycle 10 further includes a front fork 21, a front wheel WF, a handlebar 22, a swing arm 23, a rear wheel WR, a link 24, and a cushion unit 25. More specifically, the front fork 21 is steerably supported by the head pipe 12. The front wheel WF is rotatably supported at a lower end portion of the front fork 21. The handlebar 22 for steering is mounted at an upper end portion of the front fork 21. The swing arm 23 is swingably supported by the pivot plates 14. The rear wheel WR is rotatably supported at a rear end portion of the swing arm 23. The link 24 is disposed between a lower portion of the pivot plate 14 and a front portion of the swing arm 23. The shock absorber 25 is disposed between an upper portion of the pivot plate 14 and the link 24.

In FIG. 1, a front cowl 31 is provided together with a side cowl 32, a rear cowl 33, a fuel tank 34, a seat 35, a headlight 36, a side mirror 37, a rear grip 38, a tail light 39, a front fender 40, a rear fender 41, a side bag 42, and a side stand 43.

In addition, an engine (internal combustion engine) E is suspended on the main frames 13 and the pivot plates 14. Rotatable driving power outputted from the engine E is transmitted to the rear wheel WR via a drive shaft 26 that extends longitudinally.

Figure 2:
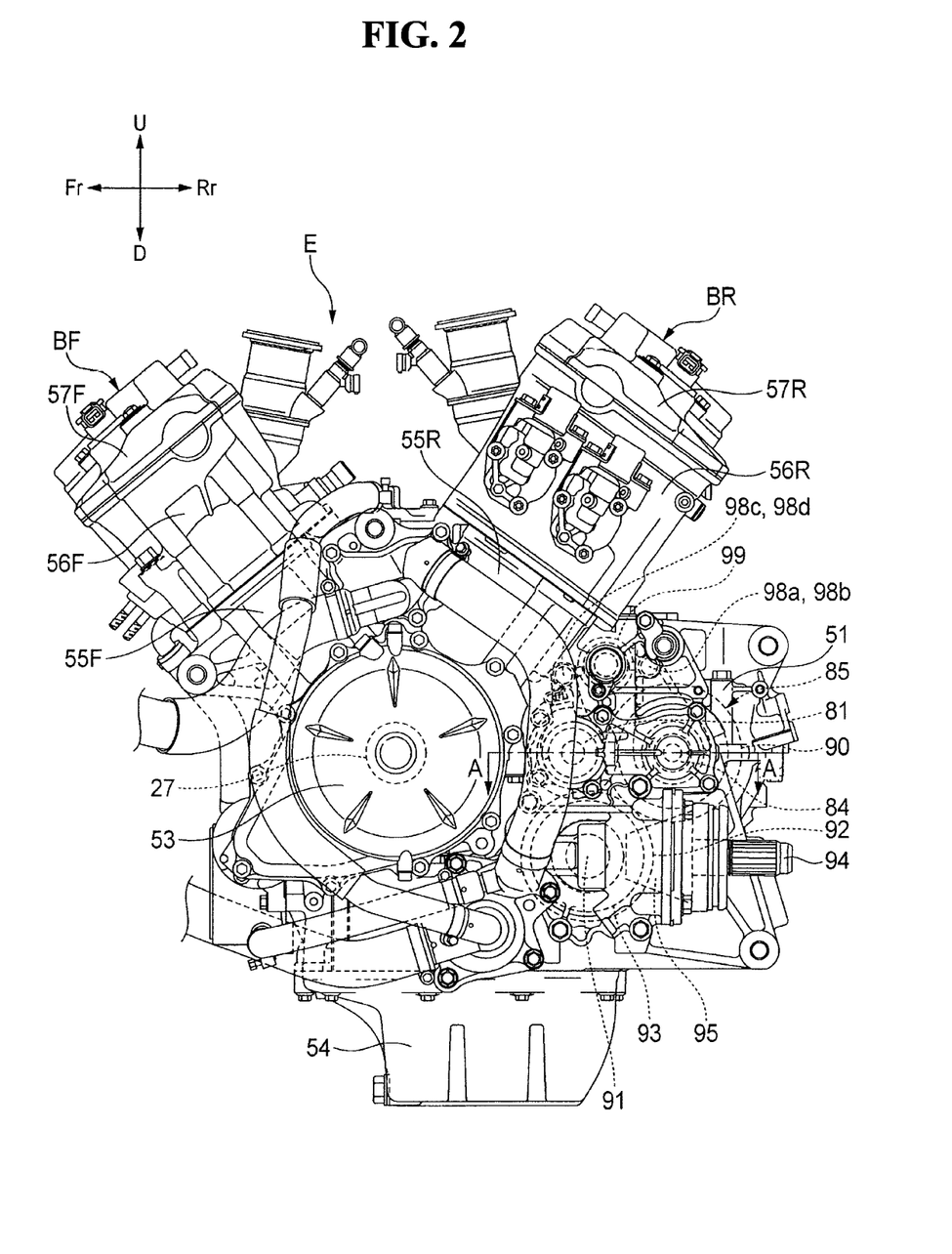
FIG. 2 is a left side elevational view showing an engine shown in FIG. 1.
Figure 3:
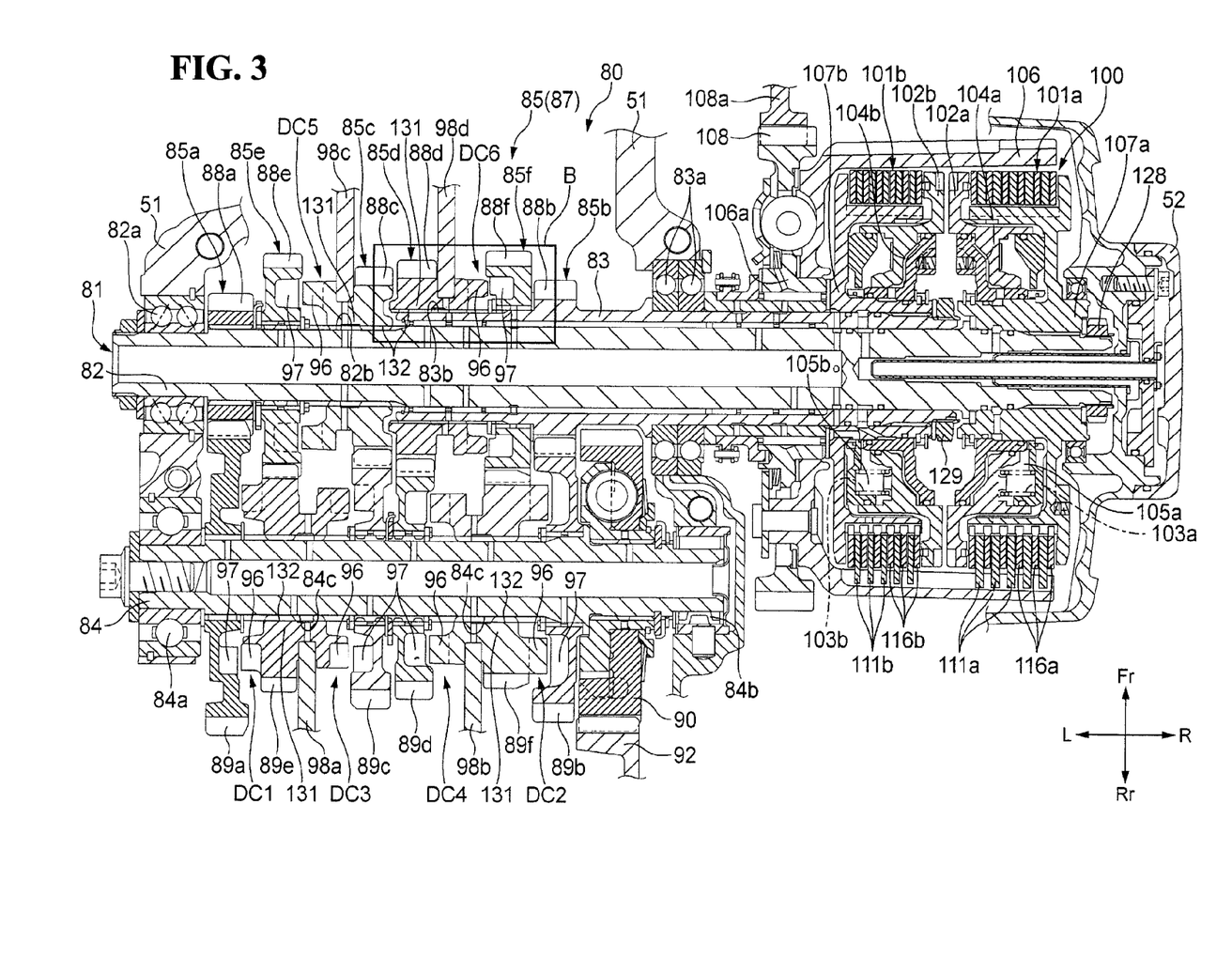
FIG. 3 is a cross-sectional view taken along line A-A of FIG. 2.

Referring to FIGS. 2 and 3, the engine E is a water-cooled V engine. The engine E has an outer shell that mainly includes a crankcase 51, a front portion bank BF, a rear portion bank BR, a clutch cover 52, an ACG cover 53, and an oil pan 54. More specifically, the front portion bank BF is disposed at an upper portion of a front side of the crankcase 51. The rear portion bank BR is disposed rearwardly of the front portion bank BF. The clutch cover 52 is disposed on the right side surface of the crankcase 51. The ACG cover 53 is disposed on the left side surface of the crankcase 51. The oil pan 54 is disposed on the lower surface of the crankcase 51. In addition, a crankshaft 27 is rotatably and removably supported along a vehicle width direction in the crankcase 51.

The front portion bank BF includes a front portion cylinder block 55F, a front portion cylinder head 56F, and a front portion head cover 57F. Specifically, the front portion cylinder block 55F is integrally formed with the crankcase 51. The front portion cylinder head 56F is connected to the front portion cylinder block 55F. The front portion head cover 57F is connected to the front portion cylinder head 56F. In addition, the rear portion bank BR includes a rear portion cylinder block 55R, a rear portion cylinder head 56R, and a rear portion head cover 57R. More specifically, the rear portion cylinder block 55R is integrally formed with the crankcase 51. The rear portion cylinder head 56R is connected to the rear portion cylinder block 55R. The rear portion head cover 57R is connected to the rear portion cylinder head 56R.

Referring to FIGS. 2 and 3, a twin-clutch gearbox 80 is housed in a rear portion of the crankcase 51. The twin-clutch gearbox 80 includes a main shaft 81, a countershaft 84, a shifting gear group 85, and a twin-clutch unit 100. More specifically, the main shaft 81 is of a dual structure including an inner shaft (a first input shaft) 82 and an outer shaft (a second input shaft) 83. The countershaft 84 is disposed in parallel with the main shaft 81. The shifting gear group 85 is disposed between the main shaft 81 and the countershaft 84. The twin-clutch unit 100 is disposed at a right end portion of the main shaft 81 coaxially. In the embodiment of the present invention, the main shaft 81, the countershaft 84, and the shifting gear group 85 constitute a transmission 87.

The main shaft 81 has a structure in which the inner shaft 82 extending crosswise across the crankcase 51 has a right end portion relatively rotatably passed into the outer shaft 83. The inner shaft 82 and the outer shaft 83 are disposed mutually concentrically, rotatable about the same axis. The inner shaft 82 has a left end portion rotatably supported by a double row ball bearing 82a in the crankcase 51. The outer shaft 83 has an intermediate portion rotatably supported by a pair of ball bearings 83a in the crankcase 51. The countershaft 84 is rotatably supported by a ball bearing 84a and a needle bearing 84b in the crankcase 51.

Referring to FIG. 3, the shifting gear group 85 is formed of first-speed to sixth-speed gear pairs 85a to 85f, each pair of gears to be in mesh with each other to correspond to each shift speed.

The first-speed gear pair 85a includes a first-speed drive gear (odd-numbered speed gear) 88a and a first-speed driven gear (odd-numbered speed gear) 89a. More specifically, the first-speed drive gear 88a is removably, and axially immovably and relatively unrotatably, supported on the inner shaft 82 of the main shaft 81. The first-speed driven gear 89a is removably, and axially immovably and relatively rotatably, supported on the countershaft 84. The first-speed driven gear 89a meshes with the first-speed drive gear 88a.

The second-speed gear pair 85b includes a second-speed drive gear (even-numbered speed gear) 88b and a second-speed driven gear (even-numbered speed gear) 89b. More specifically, the second-speed drive gear 88b is integrated with the outer shaft 83 of the main shaft 81. The second-speed driven gear 89b is removably, and axially immovably and relatively rotatably, supported on the countershaft 84. The second-speed driven gear 89b meshes with the second-speed drive gear 88b.

The third-speed gear pair 85c includes a third-speed drive gear (odd-numbered speed gear, shift gear) 88c and a third-speed driven gear (odd-numbered speed gear) 89c. More specifically, the third-speed drive gear 88c is removably, and axially movably and relatively unrotatably, supported on the inner shaft 82. The third-speed driven gear 89c is removably, and axially immovably and relatively rotatably, supported on the countershaft 84. The third-speed driven gear 89c meshes with the third-speed drive gear 88c. In addition, the third-speed drive gear 88c is removably, and axially movably and relatively unrotatably, supported on the inner shaft 82 by having a gear-side spline portion 132 formed on an inner peripheral surface of a splined portion 131 that is an inner peripheral portion of the third-speed drive gear 88c fitted axially slidably over a shaft-side spline portion 82b formed on an outer peripheral surface of the inner shaft 82.

The fourth-speed gear pair 85d includes a fourth-speed drive gear (even-numbered speed gear, shift gear) 88d and a fourth-speed driven gear (even-numbered speed gear) 89d. More specifically, the fourth-speed drive gear 88d is removably, and axially movably and relatively unrotatably, supported on the outer shaft 83. The fourth-speed driven gear 89d is removably, and axially immovably and relatively rotatably, supported on the countershaft 84. The fourth-speed driven gear 89d meshes with the fourth-speed drive gear 88d. In addition, the fourth-speed drive gear 88d is removably, and axially movably and relatively unrotatably, supported on the outer shaft 83 by having a gear-side spline portion 132 formed on an inner peripheral surface of a splined portion 131 that is an inner peripheral portion of the fourth-speed drive gear 88d fitted axially slidably over a shaft-side spline portion 83b formed on an outer peripheral surface of the outer shaft 83.

The fifth-speed gear pair 85e includes a fifth-speed drive gear (odd-numbered speed gear) 88e and a fifth-speed driven gear (odd-numbered speed gear, shift gear) 89e. More specifically, the fifth-speed drive gear 88e is removably, and axially immovably and relatively rotatably, supported on the inner shaft 82. The fifth-speed driven gear 89e is removably, and axially movably and relatively unrotatably, supported on the countershaft 84. The fifth-speed driven gear 89e meshes with the fifth-speed drive gear 88e. In addition, the fifth-speed driven gear 89e is removably, and axially movably and relatively unrotatably, supported on the countershaft 84 by having a gear-side spline portion 132 formed on an inner peripheral surface of a splined portion 131 that is an inner peripheral portion of the fifth-speed driven gear 89e fitted axially slidably over a shaft-side spline portion 84c formed on an outer peripheral surface of the countershaft 84.

The sixth-speed gear pair 85f includes a sixth-speed drive gear (even-numbered speed gear) 88f and a sixth-speed driven gear (even-numbered speed gear, shift gear) 89f. More specifically, the sixth-speed drive gear 88f is removably, and axially immovably and relatively rotatably, supported on the outer shaft 83. The sixth-speed driven gear 89f is removably, and axially movably and relatively unrotatably, supported on the countershaft 84. The sixth-speed driven gear 89f meshes with the sixth-speed drive gear 88f. In addition, the sixth-speed driven gear 89f is removably, and axially movably and relatively unrotatably, supported on the countershaft 84 by having a gear-side spline portion 132 formed on an inner peripheral surface of a splined portion 131 that is an inner peripheral portion of the sixth-speed driven gear 89f fitted axially slidably over a shaft-side spline portion 84c formed on an outer peripheral surface of the countershaft 84.

In addition, the first-speed drive gear 88a, the fifth-speed drive gear 88e, and the third-speed drive gear 88c are disposed on the inner shaft 82 in sequence from the left side in the axial direction. The fourth-speed drive gear 88d, the sixth-speed drive gear 88f, and the second-speed drive gear 88b are disposed on the outer shaft 83 in sequence from the left side in the axial direction. This results in the third-speed drive gear 88c and the fourth-speed drive gear 88d being disposed adjacent to each other.

In addition, a first dog clutch DC1 is disposed between the fifth-speed driven gear 89e as a shift gear and the first-speed driven gear 89a. The first dog clutch DC1 has a plurality of engagement protruding portions (dogs) 96 and engagement recessed portions (dog holes) 97 formed on either ones of facing surfaces of the fifth-speed driven gear 89e and the first-speed driven gear 89a, each being substantially equally spaced apart in a circumferential direction and each being engageable with each other.

In addition, a second dog clutch DC2 is disposed between the sixth-speed driven gear 89f as a shift gear and the second-speed driven gear 89b. The second dog clutch DC2 has a plurality of engagement protruding portions 96 and engagement recessed portions 97 formed on either ones of facing surfaces of the sixth-speed driven gear 89f and the second-speed driven gear 89b, each being substantially equally spaced apart in the circumferential direction and each being engageable with each other.

In addition, a third dog clutch DC3 is disposed between the fifth-speed driven gear 89e as a shift gear and the third-speed driven gear 89e. The third dog clutch DC3 has a plurality of engagement protruding portions 96 and engagement recessed portions 97 formed on either ones of facing surfaces of the fifth-speed driven gear 89e and the third-speed driven gear 89c, each being substantially equally spaced apart in the circumferential direction and each being engageable with each other.

In addition, a fourth dog clutch DC4 is disposed between the sixth-speed driven gear 89f as a shift gear and the fourth-speed driven gear 89d. The fourth dog clutch DC4 has a plurality of engagement protruding portions 96 and engagement recessed portions 97 formed on either ones of facing surfaces of the sixth-speed driven gear 89f and the fourth-speed driven gear 89d, each being substantially equally spaced apart in the circumferential direction and each being engageable with each other.

In addition, a fifth dog clutch DC5 is disposed between the third-speed drive gear 88c as a shift gear and the fifth-speed drive gear 88e. The fifth dog clutch DC5 has a plurality of engagement protruding portions 96 and engagement recessed portions 97 formed on either ones of facing surfaces of the third-speed drive gear 88c and the fifth-speed drive gear 88e, each substantially equally spaced apart in the circumferential direction and each being engageable with each other.

In addition, a sixth dog clutch DC6 is disposed between the fourth-speed drive gear 88d as a shift gear and the sixth-speed drive gear 88f. The sixth dog clutch DC6 has a plurality of engagement protruding portions 96 and engagement recessed portions 97 formed on either ones of facing surfaces of the fourth-speed drive gear 88d and the sixth-speed drive gear 88f, each being substantially equally spaced apart in a circumferential direction and each being engageable with each other.

Referring to FIGS. 2 and 3, the fifth-speed driven gear 89e, the sixth-speed driven gear 89f, the third-speed drive gear 88c, and the fourth-speed drive gear 88d as the shift gears are rotatably held by first to fourth shift forks 98a to 98d, respectively. The first to fourth shift forks 98a to 98d are slidingly moved axially by being moved axially by a shift drum 99. Take, for instance, the fourth-speed drive gear 88d, the fourth-speed drive gear 88d is slidingly moved axially by the fourth shift fork 98d, so that the engagement protruding portions 96 of the fourth-speed drive gear 88d are engaged with, or disengaged from, the engagement recessed portions 97 of the sixth-speed drive gear 88f, to thereby selectively perform gearshifting.

In addition, referring to FIGS. 2 and 3, an output gear 90 is disposed at a right end portion of the countershaft 84. A driven gear 92 disposed on a first end portion of a final shaft 91 that is rotatably supported in the crankcase 51 is in mesh with the output gear 90. A drive bevel gear 93 is disposed on a second end portion of the final shaft 91. A driven bevel gear 95 of an output shaft 94 that is connected to a front end portion of the drive shaft 26 is in mesh with the drive bevel gear 93. As a result, rotatable driving power of the countershaft 84 is transmitted to the drive shaft 26 via the output gear 90, the driven gear 92, the final shaft 91, the drive bevel gear 93, the driven bevel gear 95, and the output shaft 94.

Referring to FIG. 3, the twin-clutch unit 100 includes a first clutch 101a and a second clutch 101b. The first clutch 101a is disposed between a right end portion of the inner shaft 82 and the crankshaft 27 as a driving power source. The second clutch 101b is disposed between a right end portion of the outer shaft 83 and the crankshaft 27 as a driving power source. Gearshifting is accomplished by alternately selecting between the first clutch 101a and the second clutch 101b. The first clutch 101a and the second clutch 101b are hydraulically operated, wet-type multiple disc clutches disposed coaxially adjacent to each other.

An upshift or downshift operation of the transmission 87 is performed as follows. More specifically, while one of the first and second clutches 101a, 101b is connected, the other is disconnected and power transmission is performed by using any of the shifting gear pairs that is connected to one of the inner shaft 82 and the outer shaft 83. Meanwhile, one of the shifting gear pairs to be next connected to the other one of the inner shaft 82 and the outer shaft 83 is previously selected. Under this condition, while one of the first and second clutches 101a, 101b is connected, the other is disconnected. This selects power transmission in which the previously selected shifting gear pair is used.

The first clutch 101a and the second clutch 101b receive hydraulic pressure supplied externally to thereby axially displace pressure plates 102a, 102b, respectively, to develop a predetermined engagement force. The first and second clutches 101a, 101b include return springs 103a, 103b, connection-side hydraulic chambers 104a, 104b, and disconnection-side hydraulic chambers 105a, 105b, respectively. More specifically, the return springs 103a, 103b urge the pressure plates 102a, 102b in a direction to disconnect the clutch. The connection-side hydraulic chambers 104a, 104b give the pressure plates 102a, 102b pressure in a direction to connect the clutch. The disconnection-side hydraulic chambers 105a, 105b give the pressure plates 102a, 102b pressure in a direction to disconnect the clutch, thereby compensating for a return motion pressure of the clutch (canceling an increase in the pressure as a result of a centrifugal force of the first and second clutches 101a, 101b). The disconnection-side hydraulic chambers 105a, 105b are supplied at all times with a relatively low pressure from a lubricating oil pump not shown. The connection-side hydraulic chambers 104a, 104b are selectively supplied with a relatively high pressure from a clutch oil pump not shown. This results in each of the first and second clutches 101a, 101b being individually connected or disconnected depending on whether the hydraulic pressure is supplied or not.

The first and second clutches 101a, 101b have a substantially identical diameter and share a single clutch outer 106. The clutch outer 106 is a cylinder with a bottom, opening to the right in the vehicle width direction. The clutch outer 106 has a clutch center 107b of the second clutch 101b and a clutch center 107a of the first clutch 101a disposed therein. The clutch center 107b is disposed on the left side and the clutch center 107a is disposed on the right side inside the clutch outer 106.

A primary driven gear 108 is connected to the left side of the bottom of the clutch outer 106 via s spring damper. A primary drive gear 108a of the crankshaft 27 meshes with the primary driven gear 108. The clutch outer 106 has a hub portion 106a supported relatively rotatably on the outer shaft 83 of the main shaft 81 via a needle bearing, being integrally rotatable with rotation of the crankshaft 27. A plurality of clutch plates 111a for the first clutch 101a is relatively unrotatably supported on the right side on an inner periphery and a plurality of clutch plates 111b for the second clutch 101b is relatively unrotatably supported on the left side on the inner periphery of an outer wall portion of the clutch outer 106.

The clutch center 107a of the first clutch 101a has an inner peripheral portion splined to a right end portion of the inner shaft 82 that protrudes rightwardly from a right end portion of the outer shaft 83 and integrally fixed by a lock nut 128. In addition, a plurality of clutch discs 116a is relatively unrotatably supported on an outer peripheral portion of the clutch center 107a. Each of the clutch plates 111a and the clutch discs 116a is disposed in an alternately overlapping manner in a clutch axial direction.

The pressure plate 102a is disposed leftward of the clutch center 107a to face thereto with a predetermined spacing therefrom. Each of the clutch plates 111a and the clutch discs 116a is disposed in a stacked fashion between an outer peripheral side of the pressure plate 102a and an outer peripheral side of the clutch center 107a.

The clutch center 107b of the second clutch 101b has an inner peripheral portion splined to a right end portion of the outer shaft 83 and integrally fixed by a lock nut 129. In addition, a plurality of clutch discs 116b is relatively unrotatably supported on an outer peripheral portion of the clutch center 107b. Each of the clutch plates 111b and the clutch discs 116b is disposed in an alternately overlapping manner in the clutch axial direction.

The pressure plate 102b is disposed rightward of the clutch center 107b to face thereto with a predetermined spacing therefrom. Each of the clutch plates 111b and the clutch discs 116b is disposed in a stacked fashion between an outer peripheral side of the pressure plate 102b and an outer peripheral side of the clutch center 107b.

When the engine E is stationary (the oil pump is stationary), the first and second clutches 101a, 101b displace the pressure plate 102a to the left and the pressure plate 102b to the right with the urging forces of the return springs 103a, 103b, respectively. A clutch disconnected state is thereby established, in which frictional engagement between each of the clutch plates 111a, 111b and the clutch discs 116a, 116b is released. Under a condition in which the supply of hydraulic pressure is suspended even with the engine E operating, the urging forces of the return springs 103a, 103b and hydraulic pressures of the disconnection-side hydraulic chambers 105a, 105b act on the pressure plates 102a, 102b, so that the same clutch disconnected state as described above is established.

When the engine E is operating and the connection-side hydraulic chamber 104a is supplied with hydraulic pressure, the first clutch 101a resists the hydraulic pressure of the disconnection-side hydraulic chamber 105a and the urging force of the return spring 103a to thereby displace the pressure plate 102a rightward (in a direction to connect the clutch). As a result, each of the clutch plates 111a and the clutch discs 116a are clamped and pressed to achieve frictional engagement therebetween. This establishes a clutch connected state in which torque transmission is enabled between the clutch outer 106 and the clutch center 107a.

Similarly, when the engine E is operating and the connection-side hydraulic chamber 104b is supplied with hydraulic pressure, the second clutch 101b resists the hydraulic pressure of the disconnection-side hydraulic chamber 105b and the urging force of the return spring 103b to thereby displace the pressure plate 102b leftward (in a direction to connect the clutch). As a result, each of the clutch plates 111b and the clutch discs 116b are clamped and pressed to achieve frictional engagement therebetween. This establishes a clutch connected state in which torque transmission is enabled between the clutch outer 106 and the clutch center 107b.

In addition, when the supply of hydraulic pressure to the connection-side hydraulic chambers 104a, 104b is terminated under the clutch connected state of the first and second clutches 101a, 101b, the hydraulic pressure of the disconnection-side hydraulic chambers 105a, 105b and the urging force of the return springs 103a, 103b displace the pressure plate 102a to the left and the pressure plate 102b to the right, thereby releasing the frictional engagement between each of the clutch plates 111a, 111b and the clutch discs 116a, 116b. This establishes a clutch disconnected state in which torque transmission is disabled between the clutch outer 106 and the clutch centers 107a, 107b. As described above, use of the hydraulic pressure of the disconnection-side hydraulic chambers 105a, 105b, in addition to the urging force of the return springs 103a, 103b, allows the pressure plates 102a, 102b to be reliably displaced even with hydraulic pressure by a centrifugal force left in the connection-side hydraulic chambers 104a, 104b.

Figure 4:
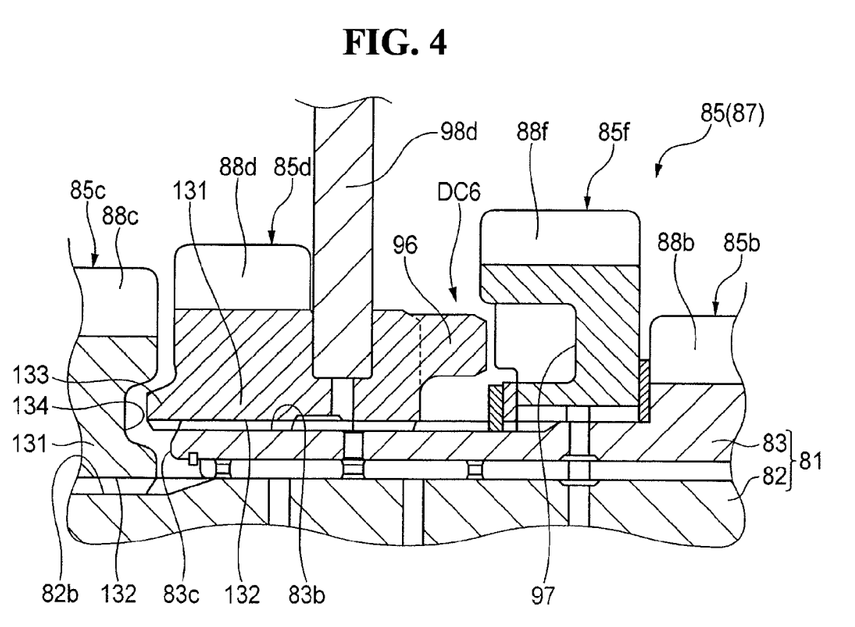
FIG. 4 is an enlarged cross-sectional view showing part B of FIG. 3.
Figure 5:
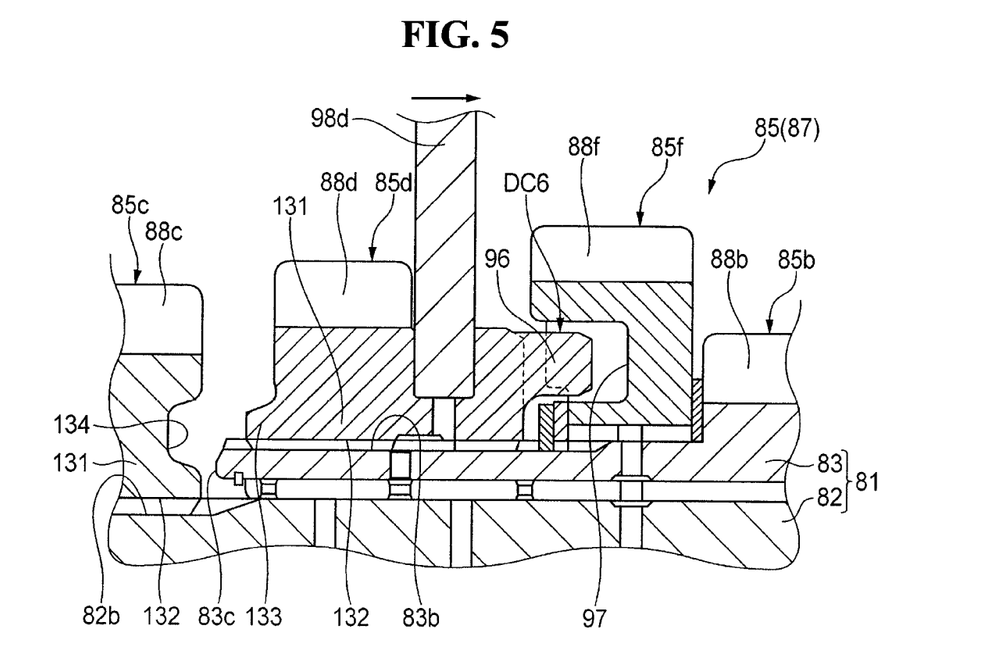
FIG. 5 is an enlarged cross-sectional view for illustrating a condition in which an engagement protruding portion of a fourth-speed drive gear is fitted in an engagement recessed portion of a sixth-speed drive gear shown in FIG. 4.

Referring to FIGS. 4 and 5, the embodiment of the present invention is adapted such that, when the fourth-speed drive gear 88d slidingly moves in a direction to disconnect the sixth dog clutch DC6, the gear-side spline portion 132 of the fourth-speed drive gear 88d slidingly moves over the shaft-side spline portion 83b of the outer shaft 83.

In addition, the splined portion 131 of the fourth-speed drive gear 88d has a protrusion 133 that axially protrudes toward the third-speed drive gear 88c, formed on an end portion of the splined portion 131 adjacent the third-speed drive gear 88c (the side spaced apart from the sixth dog clutch DC6). The third-speed drive gear 88c has a recess 134 that accommodates therein the protrusion 133, formed in a side surface of the third-speed drive gear 88c adjacent the fourth-speed drive gear 88d. The protrusion 133 formed on the splined portion 131 extends the gear-side spline portion 132 of the fourth-speed drive gear 88d. When the fourth-speed drive gear 88d slidingly moves in a direction to disconnect the sixth dog clutch DC6, the protrusion 133 protrudes on the side of the third-speed drive gear 88c from a shaft end portion 83c in which the shaft-side spline portion 83b of the outer shaft 83 is formed.

Figure 6:
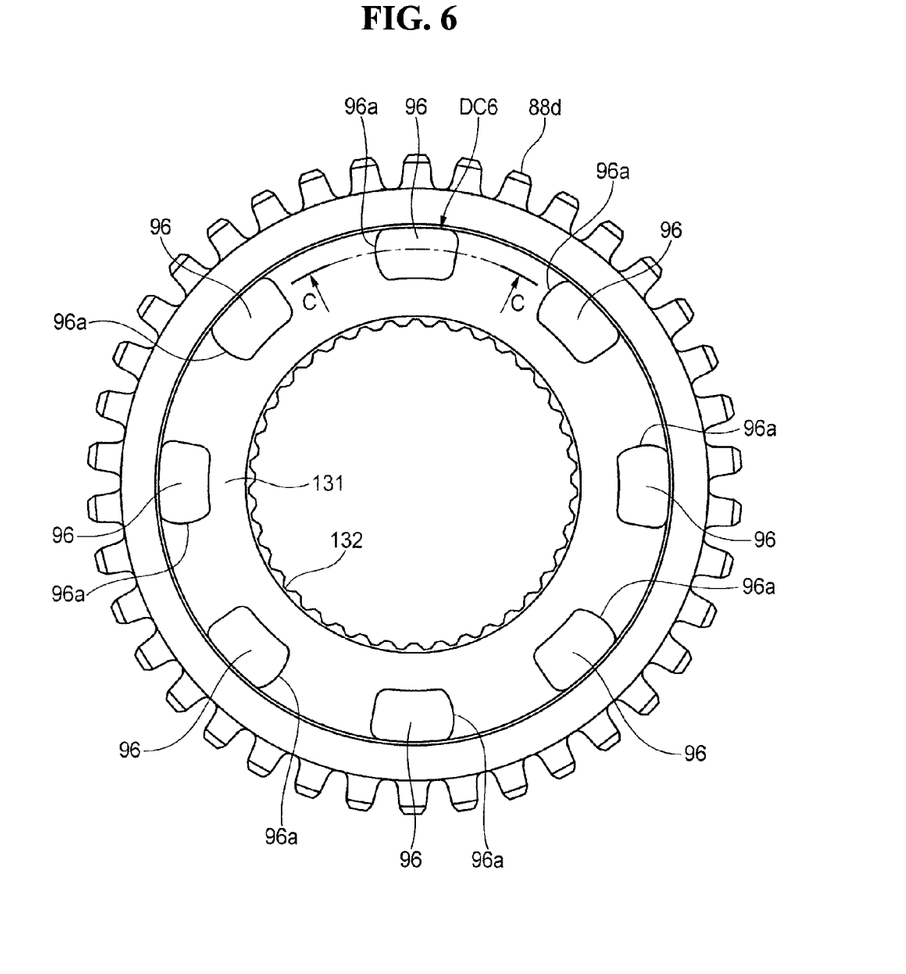
FIG. 6 shows the fourth-speed drive gear on the side of the engagement protruding portion shown in FIG. 4, as viewed from an axial direction.
Figure 7:
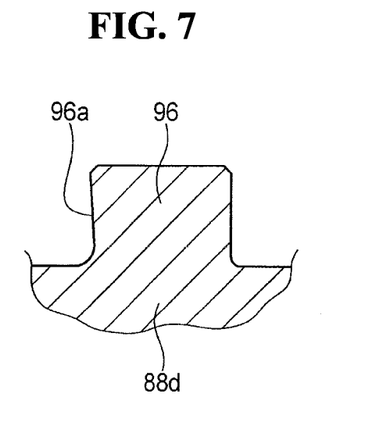
FIG. 7 is a cross-sectional view taken along line C-C of FIG. 6.

Referring to FIGS. 6 and 7, the fourth-speed drive gear 88d has the eight engagement protruding portions 96 that constitute the sixth dog clutch DC6, formed on a surface thereof facing the sixth-speed drive gear 88f. The engagement protruding portions 96 are formed substantially equally spaced apart from each other in the circumferential direction. Each of the engagement protruding portions 96 has an abutment surface 96a to be abutted against a corresponding engagement recessed portion 97 of the sixth-speed drive gear 88f. The abutment surface 96a is formed into an inverted taper having a gradually increasing circumferential width toward an axially outside direction. Note that the fourth-speed drive gear 88d has been described above as an example and the engagement protruding portions 96 of the third-speed drive gear 88c, the fifth-speed driven gear 89e, and the sixth-speed driven gear 89f have abutment surfaces 96a formed also into an inverted taper. In addition, according to the embodiment of the present invention, the abutment surface 96a of the engagement protruding portion 96 is formed into the inverted taper. This is nonetheless not the only possible arrangement and abutment surfaces of the engagement recessed portions 97 of the fifth-speed drive gear 88e, the sixth-speed drive gear 88f, the first-speed driven gear 89a, the second-speed driven gear 89b, the third-speed driven gear 89c, and the fourth-speed driven gear 89d, to be abutted against the engagement protruding portions 96, may be formed into an inverted taper.

As described heretofore, in the transmission 87 according to the embodiment of the present invention, when the fourth-speed drive gear 88d slidingly moves, the gear-side spline portion 132 of the fourth-speed drive gear 88d slidingly moves over the shaft-side spline portion 83b of the outer shaft 83. A fit length between the engagement protruding portion 96 and the engagement recessed portion 97 of the sixth dog clutch DC6, and a length of the gear-side spline portion 132 of the fourth-speed drive gear 88d, can therefore be made longer without having to make the transmission 87 have a long axial length. The shaft-side spline portion 83b of the outer shaft 83 can also be made shorter in length.

In addition, in the transmission 87 according to the embodiment of the present invention, the protrusion 133 that axially protrudes is formed on the end portion of the splined portion 131 of the fourth-speed drive gear 88d on the side spaced apart from the sixth dog clutch DC6. The protrusion 133 protrudes from the shaft end portion 83c in which the shaft-side spline portion 83b is disposed. These allow the fit length between the engagement protruding portion 96 and the engagement recessed portion 97 of the sixth dog clutch DC6 and the length of the gear-side spline portion 132 of the fourth-speed drive gear 88d to be made longer.

In addition, in the transmission 87 according to the embodiment of the present invention, the third-speed drive gear 88c has the recess 134 that accommodates therein the protrusion 133. This allows the fit length between the engagement protruding portion 96 and the engagement recessed portion 97 of the sixth dog clutch DC6 and the length of the gear-side spline portion 132 of the fourth-speed drive gear 88d to be made longer.

Further, in the transmission 87 according to the embodiment of the present invention, the abutment surface 96a of each of the engagement protruding portions 96 of the first to sixth dog clutches DC1 to DC6 is formed into an inverted taper. This reduces a thrust force that is produced when the engagement protruding portion 96 and the engagement recessed portion 97 are fitted with each other.

In addition, in the transmission 87 according to the embodiment of the present invention, the transmission 87 is used for the twin-clutch gearbox 80 that includes the first clutch 101a disposed between the inner shaft 82 and the driving power source and the second clutch 101b disposed between the outer shaft 83 and the driving power source and that performs gearshifting by alternately selecting between the first clutch 101a and the second clutch 101b. This allows the twin-clutch gearbox 80 to have a short axial length.

In addition, in the transmission 87 according to the embodiment of the present invention, the odd-numbered speed gears for the first, fifth, and third speeds 88a, 88e, 88c are disposed in sequence on the inner shaft 82, the even-numbered speed gears for the fourth, sixth, and second speeds 88d, 88f, 88b are disposed in sequence on the outer shaft 83, the third-speed drive gear 88c and the fourth-speed drive gear 88d are disposed adjacent to each other, and the gear-side spline portion 132 of the fourth-speed drive gear 88d is extended. The thrust force of the sixth-speed drive gear 88f, in which the greatest thrust force is produced, can therefore be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for an internal combustion engine, comprising:
    a main shaft;
    a countershaft disposed in parallel with the main shaft; and
    a shifting gear group disposed between the main shaft and the countershaft, the shifting gear group including:
    shift gears fitted axially slidably into shaft-side spline portions formed in at least either the main shaft or the countershaft;
    the transmission selectively performing gear shifting by using shift forks to slidingly move the shift gears axially and by using dog clutches to engage the shift gears with, or disengage the shift gears from, adjacent gears;
    wherein when the shift gear slidingly moves, a gear-side spline portion of the shift gear slidingly moves over the shaft-side spline portion,
    wherein on at least either the main shaft or the countershaft, a splined portion of the shift gear, in which the gear-side spline portion is formed, has an axially protruding protrusion formed on an end portion of the splined portion on a side spaced apart from a sixth dog clutch; and
    the protrusion protrudes from a shaft end portion in which the shaft-side spline portion is disposed.

2. The transmission for an internal combustion engine according to claim 1, wherein the shift gear disposed on the side spaced apart from the dog clutch has a recess, in which the protrusion is accommodated.

3. The transmission for an internal combustion engine according to claim 1, wherein a dog or a dog hole of the dog clutches has an abutment surface that is formed into an inverted taper.

4. The transmission for an internal combustion engine according to claim 1, wherein the main shaft includes a first input shaft and a second input shaft disposed mutually concentrically and rotatable about an identical axis; and
    the transmission is used for a twin-clutch gearbox that includes:
    a first clutch disposed between the first input shaft and a driving power source, and
    a second clutch disposed between the second input shaft and the driving power source, and
    performs the gear shifting by alternately selecting between the first clutch and the second clutch.

5. The transmission for an internal combustion engine according to claim 4, wherein odd-numbered speed gears of the shifting gear group for a first speed, a fifth speed, and a third speed are disposed in sequence on the first input shaft disposed on an inside of the second input shaft;
    even-numbered speed gears of the shifting gear group for a fourth speed, a sixth speed, and a second speed are disposed in sequence on the second input shaft;
    a third-speed drive gear and a fourth-speed drive gear are disposed adjacent to each other; and
    the gear-side spline portion of the fourth-speed drive gear is extended.

6. A transmission for an internal combustion engine, comprising:
    a main shaft;
    a countershaft disposed in parallel with the main shaft; and
    a shifting gear group disposed between the main shaft and the countershaft, the shifting gear group including:
    shift gears fitted axially slidably into shaft-side spline portions formed in the countershaft;
    the transmission selectively performing gear shifting by using shift forks to slidingly move the shift gears axially and by using dog clutches to engage the shift gears with, or disengage the shift gears from, adjacent gears;
    wherein when the shift gear slidingly moves, a gear-side spline portion of the shift gear slidingly moves over the shaft-side spline portion, wherein on the countershaft, a splined portion of the shift gear, in which the gear-side spline portion is formed, has an axially protruding protrusion formed on an end portion of the splined portion on a side spaced apart from a sixth dog clutch; and
    the protrusion protrudes from a shaft end portion in which the shaft-side spline portion is disposed.

7. The transmission for an internal combustion engine according to claim 6, wherein the shift gear disposed on the side spaced apart from the dog clutch has a recess, in which the protrusion is accommodated.

8. The transmission for an internal combustion engine according to claim 6, wherein a dog or a dog hole of the dog clutches has an abutment surface that is formed into an inverted taper.

9. The transmission for an internal combustion engine according to claim 6, wherein the main shaft includes a first input shaft and a second input shaft disposed mutually concentrically and rotatable about an identical axis; and
    the transmission is used for a twin-clutch gearbox that includes:

a first clutch disposed between the first input shaft and a driving power source, and a second clutch disposed between the second input shaft and the driving power source, and performs the gear shifting by alternately selecting between the first clutch and the second clutch.

10. The transmission for an internal combustion engine according to claim 9, wherein odd-numbered speed gears of the shifting gear group for a first speed, a fifth speed, and a third speed are disposed in sequence on the first input shaft disposed on an inside of the second input shaft;

even-numbered speed gears of the shifting gear group for a fourth speed, a sixth speed, and a second speed are disposed in sequence on the second input shaft;

a third-speed drive gear and a fourth-speed drive gear are disposed adjacent to each other; and the gear-side spline portion of the fourth-speed drive gear is extended.

11. A transmission for an internal combustion engine, comprising:

a main shaft;

a countershaft disposed in parallel with the main shaft;

a shifting gear group disposed between the main shaft and the countershaft, said shifting gear group including shift gears fitted axially slidably into shaft-side spline portions formed in at least either the main shaft or the countershaft;

shift forks operatively connected to the shift gears for moving the shift gears axially wherein the transmission selectively performs a gear shifting;

dog clutches for engaging the shift gears with, or disengaging the shift gears from, adjacent gears; and a gear-side spline portion of the shift gear slidingly movable over the shaft-side spline portion when the shift gear is slidingly moved by the shift forks wherein on at least either the main shaft or the countershaft, a splined portion of the shift gear, in which the gear-side spline portion is formed, has an axially protruding protrusion formed on an end portion of the splined portion on a side spaced apart from a sixth dog clutch; and the protrusion protrudes from a shaft end portion in which the shaft-side spline portion is disposed.

12. The transmission for an internal combustion engine according to claim 11, wherein the splined portion of the shift gear, in which the gear-side spline portion is formed only on the main shaft, and has the axially protruding protrusion formed on the end portion of the splined portion on the side spaced apart from the sixth dog clutch; and the protrusion protrudes from the shaft end portion in which the shaft-side spline portion is disposed.

13. The transmission for an internal combustion engine according to claim 11, wherein the shift gear disposed on the side spaced apart from the dog clutch has a recess, in which the protrusion is accommodated.

14. The transmission for an internal combustion engine according to claim 11, wherein a dog or a dog hole of the dog clutches has an abutment surface that is formed into an inverted taper.

15. The transmission for an internal combustion engine according to claim 13, wherein a dog or a dog hole of the dog clutches has an abutment surface that is formed into an inverted taper.

16. The transmission for an internal combustion engine according to claim 11, wherein the main shaft includes a first input shaft and a second input shaft disposed mutually concentrically and rotatable about an identical axis; and the transmission is used for a twin-clutch gearbox that includes:

a first clutch disposed between the first input shaft and a driving power source, and a second clutch disposed between the second input shaft and the driving power source and that performs the gear shifting by alternately selecting between the first clutch and the second clutch.

17. The transmission for an internal combustion engine according to claim 13, wherein the main shaft includes a first input shaft and a second input shaft disposed mutually concentrically and rotatable about an identical axis; and the transmission is used for a twin-clutch gearbox that includes a first clutch disposed between the first input shaft and a driving power source and a second clutch disposed between the second input shaft and the driving power source and that performs the gear shifting by alternately selecting between the first clutch and the second clutch.

18. The transmission for an internal combustion engine according to claim 16, wherein odd-numbered speed gears of the shifting gear group for a first speed, a fifth speed, and a third speed are disposed in sequence on the first input shaft disposed on an inside of the second input shaft;

even-numbered speed gears of the shifting gear group for a fourth speed, a sixth speed, and a second speed are disposed in sequence on the second input shaft;

a third-speed drive gear and a fourth-speed drive gear are disposed adjacent to each other; and the gear-side spline portion of the fourth-speed drive gear is extended.

* * * * *